(12) United States Patent
Lee et al.

(10) Patent No.: US 6,728,463 B2
(45) Date of Patent: Apr. 27, 2004

(54) OPTICAL ATTENUATOR USING MULTI-MODE INTERFERENCE

(75) Inventors: Doohwan Lee, #426-2303, Hyundai Apt, 92, Seohyun-dong, Bundang-gu, Seongnam-si, Gyonggi-do 463-777 (KR); Sangsun Lee, Seoul (KR)

(73) Assignee: Doohwan Lee, Seongnam (KR)

( * ) Notice: Subject to any disclaimer, the term of this patent is extended or adjusted under 35 U.S.C. 154(b) by 153 days.

(21) Appl. No.: 10/004,811

(22) Filed: Dec. 7, 2001

(65) Prior Publication Data

US 2003/0053788 A1 Mar. 20, 2003

(30) Foreign Application Priority Data

Sep. 10, 2001 (KR) ........................................ 2001-55625

(51) Int. Cl.[7] .................................................. G02B 6/00
(52) U.S. Cl. ..................................................... 385/140
(58) Field of Search ................................ 385/140, 129, 385/130, 131, 132; 359/288

(56) References Cited

U.S. PATENT DOCUMENTS 5,974,216 A * 10/1999 Nakaya ...................... 385/140

FOREIGN PATENT DOCUMENTS

KR     1999020073     3/1999

* cited by examiner

*Primary Examiner*—Walter E. Snow
(74) *Attorney, Agent, or Firm*—Greenblum & Bernstein, P.L.C.

(57) ABSTRACT

An optical attenuator includes a first multi-mode waveguide varying a phase of an optical signal input through an input terminal; first and second single-mode waveguides having an input terminal coupled to an output terminal of the first multi-mode waveguide and varying a phase of the optical signal by a thermo-optic effect by electrodes attached thereto; and a second multi-mode waveguide having an input terminal coupled to an output terminal of the first and second single-mode waveguides and varying a phase of the optical signal, wherein a predetermined optical power distribution obtained by offsetting or adding up a phase varied in the first and second multi-mode waveguides and a phase varied by the thermo-optic effect is transferred to an output terminal of the second multi-mode waveguide.

10 Claims, 2 Drawing Sheets

OPTICAL ATTENUATOR USING MULTI-MODE INTERFERENCE

BACKGROUND OF THE INVENTION

1. Field of the Invention

The present invention relates to an optical attenuator, and more particularly, to an optical attenuator using a multi-mode interference.

2. Description of Related Art

An optical attenuator is one of very important elements of an optical circuit for an optical communication to control an optical signal transmission. The optical attenuator performs an add/drop function to equalize an optical power of channels of a wavelength division multiplexing (WDM) system. Also, when a total power of an erbium doped fiber amplifier (EDFA) is varied, the optical attenuator flats a gain in order to prevent an output variation according to a wavelength. The optical attenuator also controls a magnitude of a receiving signal according to a maximum signal magnitude of a receiving end so that the receiving end may not be overloaded.

As the optical attenuator, a fiber optical attenuator is wide in use. However, the fiber optical attenuator is large in size and is complicated in manufacturing process. Therefore, manufacturing yield is low, and a production cost is high.

Also, a conventional optical attenuator based on a planar lightwave circuit (PLC) technique (e.g., disclosed in Korean Patent Publication No. 1999-20073) uses a directional coupler. Thus, the optical attenuator is large in length and wide in width, and is narrow in manufacturing process margin. In addition, since a bent waveguide has to be used at various locations due to the directional coupler, a length of the optical attenuator becomes larger, and a loss also becomes larger.

SUMMARY OF THE INVENTION

To overcome the problems described above, preferred embodiments of the present invention provide an optical attenuator having a wide manufacturing process margin.

It is another object of the present invention to provide a small-sized optical attenuator.

It is another object of the present invention to provide an optical attenuator having low power consumption.

In order to achieve the above object, the preferred embodiments of the present invention provide an optical attenuator, comprising: a first multi-mode waveguide varying a phase of an optical signal input through an input terminal;

first and second single-mode waveguides having an input terminal coupled to an output terminal of the first multi-mode waveguide and varying a phase of the optical signal by a thermo-optic effect by electrodes attached thereto; and a second multi-mode waveguide having an input terminal coupled to an output terminal of the first and second single-mode waveguides and varying a phase of the optical signal, wherein a predetermined optical power distribution obtained by offsetting or adding up a phase varied in the first and second multi-mode waveguides and a phase varied by the thermo-optic effect is transferred to an output terminal of the second multi-mode waveguide.

For the sake of an additional attenuation, two or more optical attenuators can be serially connected to each other.

A length of the first and second multi-mode waveguides depends on a wavelength of the optical signal and a material thereof. The input terminals and the output terminals of the first and second multi-mode waveguides are located at a bisectional point or a trisectional point of a width of the first and second multi-mode waveguides. A phase varied by the thermo-optic effect is in a range between 0° to 180°. A phase varied in the first and second multi-mode waveguides is 0° or 270°.

The optical attenuator according to the present invention has the following advantages: since the optical attenuator employs a multi-mode waveguide and thus can exclude a bent single-mode waveguide, a manufacturing process margin is large. Also, a length of the optical attenuator to obtain a certain optical power distribution becomes short. In addition, power consumption can be reduced by lowering an applied voltage of the temperature control electrodes.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Figure 1:
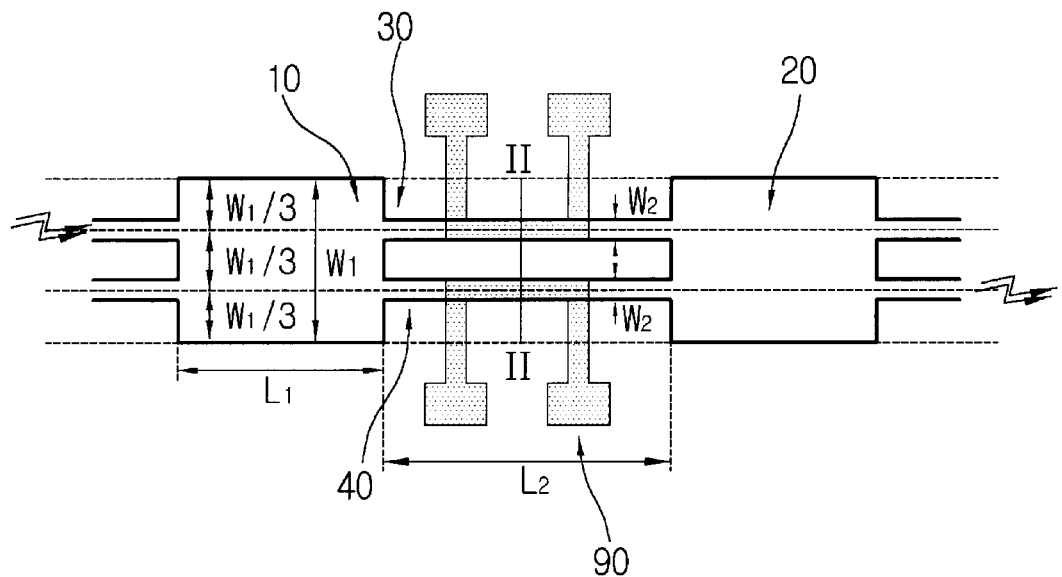
FIG. 1 is a plan view illustrating an optical attenuator according to a first embodiment of the present invention.

Reference will now be made in detail to preferred embodiments of the present invention, example of which is illustrated in the accompanying drawings. Like reference numerals denote like parts.

When an optical signal is input to a multi-mode waveguide and proceeds, the optical signal is distributed, and an image of a wave excited in an input optical signal is reproduced in a predetermined length by a constructive interference between modes. This is an inherent characteristic of light called a self-image formation, and is a phenomenon that one or more images are periodically formed along a proceed direction of the waveguide. A basic principle of this self-image formation is described in J. lightwave technol., vol. 13, p. 615, 1995.

At this point, the shortest length that a K-number of output waveforms are obtained is obtained using a paired interference principle as follows:

$$L_k = \frac{L_\pi}{K}, L_\pi \cong \frac{4n_e W_e^2}{3\lambda_0}$$

where $\lambda_0$ denotes a wavelength of an optical signal, and $n_e$ and $W_e$ denote an effective refractive index and an effective width of the multi-mode waveguide, respectively.

Figure 2:
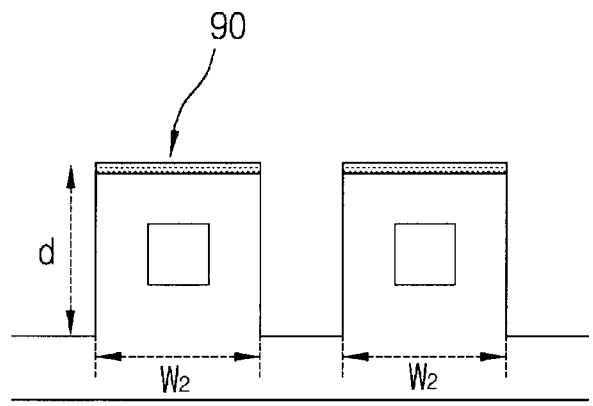
FIG. 2 is a cross-sectional view taken along line II—II of FIG. 1.

FIG. 1 is a plan view illustrating an optical attenuator according to a first embodiment of the present invention. FIG. 2 is a cross-sectional view taken along line II—II of FIG. 1.

The optical attenuator of FIG. 1 is based on a planar lightwave circuit (PLC) technique and uses a multi-mode interference. The optical attenuator of FIG. 1 includes a first multi-mode waveguide 10, a second multi-mode waveguide 20, a first single-mode waveguide 30, and a second single-mode waveguide 40.

The first and second multi-mode waveguides 10 and 20 provides a strong guiding and have a predetermined length $L_1$ (=$L_\pi/2$), a predetermined width ($W_1$) and a predetermined thickness (d), respectively. Temperature control electrodes 90 are attached to the first and second single-mode waveguides 30 and 40. The first and second single-mode waveguides 30 and 40 have a predetermined length $L_2$, a predetermined width $W_2$, and a predetermined thickness d, respectively.

Meanwhile, a length of the first and second multi-mode waveguides 10 and 20 depends on a wavelength of the optical signal and a material thereof.

An input optical signal is transferred to an input terminal located at a $W_1/3$ position or a 2 $W_1/3$ position of the first multi-mode waveguide 10. The input optical signal gets to have a phase difference of 270° by a paired interference while proceeding in the first multi-mode waveguide 10, and is distributed in a rate of 50:50 and then is transferred to output terminals located at a $W_1/3$ position and a 2 $W_1/3$ position of the first multi-mode waveguide 10.

The temperature control electrodes 90 attached to the first and second single-mode waveguides 30 and 40 vary an effective refractive index of the first and second single-mode waveguides 30 and 40, by a thermo-optic effect. The optical signals therefore get to have a desired phase variation (0° to 180°) due to a varied effective refractive index.

The optical signals having a varied phase are transferred to input terminals located at a $W_1/3$ position and a 2 $W_1/3$ position of the second multi-mode waveguide 20. The respective input optical signals get to have a phases difference of 270° by a paired interference while proceeding in the multi-mode waveguide 20, and are distributed in a rate of 50:50 and then are transferred to output terminals located at a $W_1/3$ position and a 2 $W_1/3$ position of the second multi-mode waveguide 20.

The respective optical signals that are transferred to the output terminals of the second multi-mode waveguide 20 make a desired optical power distribution in such a manner that the phase (0° to 180°) varied by a thermo-optic effect and a phase (270°) varied by the multi-mode interference are offset or added up.

Figure 3:
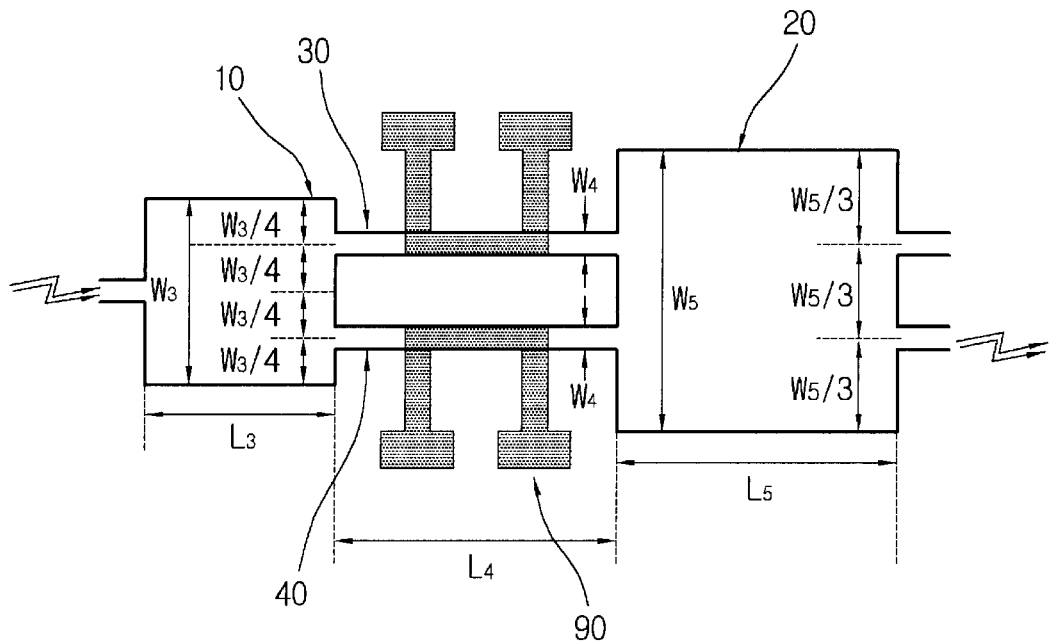
FIG. 3 is a plan view illustrating an optical attenuator according to a second embodiment of the present invention.

FIG. 3 is a plan view illustrating an optical attenuator according to a second embodiment of the present invention. The optical attenuator of FIG. 3 is based on a planar lightwave circuit (PLC) technique and uses a multi-mode interference. The optical attenuator of FIG. 3 includes a first multi-mode waveguide 10, a second multi-mode waveguide 20, a first single-mode waveguide 30, and a second single-mode waveguide 40.

The first and second multi-mode waveguides 10 and 20 provides a strong guiding. The first multi-mode waveguide 10 has a predetermined length $L_3$ (=$L_\pi/2$), a predetermined width ($W_3$) and a predetermined thickness (d), and the second multi-mode waveguide 20 has a predetermined length $L_5$ (=$L_\pi/2$), a predetermined width ($W_5$) and a predetermined thickness (d). Temperature control electrodes 90 are attached to the first and second single-mode waveguides 30 and 40. The first and second single-mode waveguides 30 and 40 have a predetermined length $L_3$, a predetermined width $W_4$, and a predetermined thickness d, respectively.

An input optical signal is transferred to an input terminal located at a $W_3/2$ position of the first multi-mode waveguide 10. The input optical signal gets to have a phase difference of 0° by a general interference while proceeding in the first multi-mode waveguide 10, and is distributed in a rate of 50:50 and then is transferred to output terminals located at a $W_3/4$ position and a 3 $W_3/4$ position of the first multi-mode waveguide 10.

The temperature control electrodes 90 are attached to the first and second single-mode waveguides 30 and 40 vary an effective refractive index of the first and second single-mode waveguides 30 and 40, by a thermo-optic effect. The optical signals therefore get to have a desired phase variation (0° to 180°) due to a varied effective refractive index.

The optical signals having a varied phase are transferred to an input terminal located at a $W_5/3$ position or a 2 $W_5/3$ position of the second multi-mode waveguide 20. The respective input optical signals get to have a phases difference of 270° by a paired interference while proceeding in the multi-mode waveguide 20, and are distributed in a rate of 50:50 and then are transferred to output terminals located at a $W_5/3$ position and a 2 $W_5/3$ position of the second multi-mode waveguide 20.

The respective optical signals that is transferred to the output terminals of the second multi-mode waveguide 20 make a desired optical power distribution in such a manner that the phase (0° to 180°) varied by a thermo-optic effect and a phase (270°) varied by the multi-mode interference are offset or added up.

Figure 4:
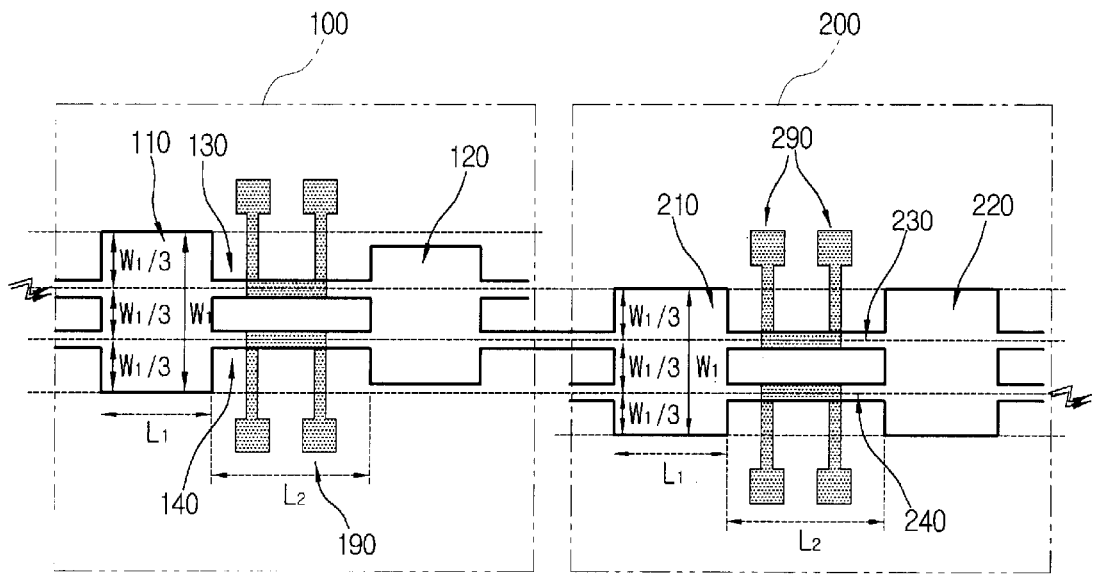
FIG. 4 is a plan view illustrating an optical attenuator according to a third embodiment of the present invention.

FIG. 4 is a plan view illustrating an optical attenuator according to a third embodiment of the present invention.

The optical attenuator of FIG. 4 includes a first optical attenuator 100 and a second optical attenuator 200 which are serially connected to each other for the sake of an additional optical attenuation. In FIG. 4, two optical attenuators are serially connected for the sake of an additional attenuation, but three or more optical attenuators can be serially connected. The first and second optical attenuators 100 and 200 of FIG. 4 are based on a planar lightwave circuit (PLC) technique and use a multi-mode interference.

The first attenuator 100 includes first and second multi-mode waveguides 110 and 120, and first and second single-mode waveguides 130 and 140. The first and second multi-mode waveguides 110 and 120 provide a strong guiding. The first and second multi-mode waveguides 110 and 120 have a predetermined length $L_1$ (=$L_\pi/2$), a predetermined width ($W_1$) and a predetermined thickness (d), respectively. Temperature control electrodes 190 are attached to the first and second single-mode waveguides 130 and 140. The first and second single-mode waveguides 130 and 140 have a predetermined length $L_2$, a predetermine $W_2$, and a predetermined thickness d, respectively.

The second attenuator 200 includes first and second multi-mode waveguides 210 and 220, and first and second single-mode waveguides 230 and 240. The first and second multi-mode waveguides 210 and 220 provide a strong guiding. The first and second multi-mode waveguides 210 and 220 have a predetermined length $L_1$ (=$L_\pi/2$), a predetermined width ($W_1$) and a predetermined thickness (d), respectively. Temperature control electrodes 190 are attached to the first and second single-mode waveguides 130 and 140. The first and second single-mode waveguides 130 and 140 have a predetermined length $L_2$, a predetermined width $W_2$, and a predetermined thickness d, respectively.

An input optical signal is transferred to an input terminal of the first multi-mode waveguide 110 of the first optical attenuator 100. The input optical signal has a phase difference of 0° or 270° by a general interference or a paired interference while proceeding in the first multi-mode waveguide 110, and is distributed in a rate of 50:50 and then is transferred to output terminals of the first multi-mode waveguide 110.

The temperature control electrodes 190 attached to the first and second single-mode waveguides 130 and 140 vary an effective refractive index of the first and second single-mode waveguides 130 and 140, by a thermo-optic effect. The optical signals therefore get to have a desired phase variation (0° to 180°) due to a varied effective refractive index.

The optical signals having a varied phase are transferred to input terminals of the second multi-mode waveguide 120. The respective input optical signals get to have a phases difference of 0° or 270° by a multi-mode interference while proceeding in the multi-mode waveguide 120, and are distributed in a rate of 50:50 and then are transferred to an output terminal of the second multi-mode waveguide 120.

The respective optical signals that are transferred to the output terminal of the second multi-mode waveguide 120 make a desired optical power distribution in such a manner that the phase (0° to 180°) varied by a thermo-optic effect and a phase varied by the multi-mode interference are offset or added up.

For the sake of an additional optical attenuation, an output optical signal of the second multi-mode waveguide 120 of the first attenuator 100 is transferred to an input terminal of the first multi-mode waveguide 210 of the second optical attenuator 200. The input optical signal has a phase difference of 0° or 270° by a multi-mode interference while proceeding in the first multi-mode waveguide 210, and is distributed in a rate of 50:50 and then is transferred to output terminals of the first multi-mode waveguide 210.

The temperature control electrodes 290 attached to the first and second single-mode waveguides 230 and 240 vary an effective refractive index of the first and second single-mode waveguides 230 and 240, by a thermo-optic effect. The optical signals therefore get to have a desired phase variation (0° to 180°) due to a varied effective refractive index.

The optical signals having a varied phase are transferred to input terminals of the second multi-mode waveguide 220. The respective input optical signals get to have a phases difference of 270° by a multi-mode interference while proceeding in the multi-mode waveguide 220, and are distributed in a rate of 50:50 and then are transferred to an output terminal of the second multi-mode waveguide 220.

The respective optical signals that are transferred to the output terminal of the second multi-mode waveguide 220 make a desired optical power distribution in such a manner that the phase (0° to 180°) varied by a thermo-optic effect and a phase varied by the multi-mode interference are offset or added up.

As described herein before, the optical attenuator according to the present invention has the following advantages: since the optical attenuator employs a multi-mode waveguide and thus can exclude a bent single-mode waveguide, a manufacturing process margin is large. Also, a length of the optical attenuator to obtain a certain optical power distribution becomes short. In addition, power consumption can be reduced by lowering an applied voltage of the temperature control electrodes.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical attenuator, comprising:
    a first multi-mode waveguide that varies a phase of an optical signal input through an input terminal;
    first and second single-mode waveguides having an input terminal coupled to an output terminal of the first multi-mode waveguide and varying a phase of the optical signal by a thermo-optic effect by electrodes attached thereto; and
    a second multi-mode waveguide having an input terminal coupled to an output terminal of the first and second single-mode waveguides and varying a phase of the optical signal,
    wherein a predetermined optical power distribution is obtained by one of offsetting and adding a phase varied in the first and second multi-mode waveguides and a phase varied by the thermo-optic effect, and is transferred to an output terminal of the second multi-mode waveguide.

2. The attenuator of claim 1, wherein a length of the first and second multi-mode waveguides depends on a wavelength of the optical signal and a material of the first and second multi-mode waveguides.

3. The attenuator of claim 1, wherein the input terminals and the output terminals of the first and second multi-mode waveguides are located at one of a bisectional point and a trisectional point of a width of the first and second multi-mode waveguides.

4. The attenuator of claim 1, wherein a phase varied by the thermo-optic effect is in a range between 0° to 180°.

5. The attenuator of claim 1, wherein a phase varied in the first and second multi-mode waveguides is one of 0° and 270°.

6. An optical attenuator including at least two optical attenuators serially connected to each other, each of the optical attenuators comprising:
    a first multi-mode waveguide that varies a phase of an optical signal input through an input terminal;
    first and second single-mode waveguides having an input terminal coupled to an output terminal of the first multi-mode waveguide and varying a phase of the optical signal by a thermo-optic effect by electrodes attached thereto; and
    a second multi-mode waveguide having an input terminal coupled to an output terminal of the first and second single-mode waveguides and varying a phase of the optical signal,
    wherein a predetermined optical power distribution is obtained by one of offsetting and adding a phase varied in the first and second multi-mode waveguides and a phase varied by the thermo-optic effect, and is transferred to an output terminal of the second multi-mode waveguide.

7. The attenuator of claim 6, wherein a length of the first and second multi-mode waveguides depends on a wavelength of the optical signal and a material of the waveguides.

8. The attenuator of claim 6, wherein the input terminals and the output terminals of the first and second multi-mode waveguides are located at one of a bisectional point and a trisectional point of a width of the first and second multi-mode waveguides.

9. The attenuator of claim 6, wherein a phase varied by the thermo-optic effect is in a range between 0° to 180°.

10. The attenuator of claim 6, wherein a phase varied in the first and second multi-mode waveguides is one of 0° and 270°.

* * * * *